January 24, 1939

2,145,015

UNITED STATES PATENT OFFICE 2,145,015

DRY DISINFECTING COMPOSITION AND METHOD OF MAKING THE SAME

Max Y. Seaton, Greenwich, Conn., assignor, by mesne assignments, to Westvaco Chlorine Products Corporation, New York, N. Y., a corporation of Delaware No Drawing. Application June 4, 1936, Serial No. 83,591

2 Claims. (Cl. 167—18)

This invention relates to a dry disinfecting composition and methods of making the same; and it comprises as a new composition of matter clearly soluble in water and containing available chlorine, a dry powder containing admixed sodium carbonate and disodium phosphate, both carrying water of crystallization, and also containing sodium hypochlorite; and it further comprises a method of making such a preparation wherein a soda bleach liquor is admixed with pulverulent dry sodium carbonate (soda ash) and dry disodium phosphate in about equal proportions, the amount of the admixed matter being sufficient to take up the water of the liquor as water of crystallization; all as more fully hereinafter set forth and as claimed.

The need of a dry stable composition containing available chlorine in the form of sodium hypochlorite has long been known, but it has proved difficult to meet. Liquid preparations of this kind have been known and used for over a century. They have the advantage over chloride of lime that they mix clearly with water and the disadvantage that they are more expensive to package and ship. These liquors can be made by chlorinating a solution of caustic soda to a point somewhat short of completion, an excess of alkali being left for the sake of stability. Such a solution can be dried in vacuo at a temperature not exceeding 50° C., thereby giving a dry preparation, provided there is a sufficient excess of alkali, but as a manufacturing proposition the conditions are prohibitive. Dry compositions can be made by admixing dry soda ash with a bleach liquor in such an amount as to take up the water as water of crystallization, but these have not proved particularly successful commercially; partly because of the necessity of a nice adjustment of alkalinity and other conditions in making the bleach liquor. Other propositions have been to make pulverulent preparations with the use of mixtures of disodium phosphate and trisodium phosphate in certain proportions; the proportions being such as will leave enough alkali in the system to maintain the stability of the sodium hypochlorite, NaOCl, which is contained in the bleach liquor, together with NaCl and the excess of NaOH. Sodium hypochlorite tends to go over to sodium chlorate, NaClO₃, by rearrangement, unless there be a considerable amount of alkali present. Sodium hypochlorite, NaOCl, is in itself a substance of high alkalinity, but the presence of more caustic alkali (NaOH) is necessary for stability; among other actions, to retard or prevent the formation of chlorate. Decompositions of the alkaline NaOCl give neutral solutions, whether it be from the formation of NaCl or be by re-arrangement of three molecules into 2NaCl and NaClO₃. The apparent alkalinity progressively diminishes with deterioration of bleach liquor.

The proportion of free alkali required in a dry preparation is greater than in a liquid preparation and it must be greater in any preparation exposed to temperatures ranging up towards 50° C. In all the dry preparations produced by setting up a liquid with a crystallizable salt, there is an evolution of heat in the crystallization; the temperature tends to rise. Quite unexpectedly, I have found that stable, dry preparations can be made containing no more than the usual amount of excess alkali of commercial bleach liquors, if the conversion to a dry solid be effected with a mixture of dry sodium carbonate (soda ash) and dry disodium phosphate. There is an elevation of temperature in crystallization, but this does not seem to matter, although an undue rise in temperature should be avoided. In bleach liquors made by chlorinating caustic soda solutions, the greater the amount of available chlorine, the less the residual alkali, and vice versa. Using the present method, bleach liquors of high available chlorine content can be converted into dry preparations of good stability. It is, however, of course preferable to use bleach liquors containing a substantial amount of excess alkalinity. The velocity of deterioration in any preparation containing NaOCl bears a mathematical relation to the proportion of excess NaOH present. These relations obtain in the dry preparations as well as in the aqueous liquors.

The best relative ratio between soda ash and dry disodium phosphate varies somewhat with the liquor, but good results are obtained with most of the liquors by using the two, the soda ash and the dry disodium phosphate, in about equal proportions. They may be mixed before addition to the bleach liquor, or added simultaneously. Both salts appear to remain as such in the final product. If there is any conversion of disodium phosphate to trisodium phosphate at the expense of the excess caustic alkali in the bleach liquor, it appears to be unimportant.

In a typical embodiment of the present invention, I gradually added the soda ash and the dry disodium phosphate to a batch of chlorinated liquor containing between 150 and 160 grams per liter of available chlorine, and approximately 20 grams per liter of caustic soda in excess. The liquor was contained in an ordinary mixer provided with a stirrer. Cooling is often useful but in this particular case no special cooling means were needed, development of heat being slow with no great rise in temperature. In this particular case, I made a mixture of the soda ash and the dry disodium phosphate, both as powders, in equal parts and added it to the liquor in the proportion of a kilogram per liter. As the powder was stirred into the liquid, the mix became pasty and progressively lost liquidity until finally a dry powder resulted. This powder contained about 3 per cent available chlorine and was stable in packaging and shipping.

The preparation is particularly useful for cleaning and disinfecting milk cans and it is also useful in cleaning out beer casks, pipes, etc., for which hitherto a mixture of bleaching liquor and caustic soda has been considered best. The new preparation is quite as effective for this purpose.

Whatever the reason, the mixture is stable although it contains, practically speaking, no more and no less caustic alkalinity than the original bleach liquor. In water it dissolves to give a clear solution. It can be diluted to any extent desired in use. The disodium phosphate and the sodium carbonate contained in the solution as both good detergents, because of their alkalinity and the hypochlorite retains its disinfectant and bactericidal powers. The liquid being alkaline, the hypochlorite does not rapidly deteriorate.

What I claim is:—

1. A new composition of matter in the form of a dry powder stable on storage and having detergent and disinfecting properties, said powder comprising essentially crystallized sodium carbonate, crystallized disodium phosphate and sodium hypochlorite.

2. The method of making a dry disinfecting preparation freely soluble in water and stable upon standing, packaging and shipping, which comprises adding to commercial bleach liquor a mixture of about equal parts of dry disodium phosphate and soda ash, the amount added being that sufficient to take up the water of the liquor as water of crystallization.

MAX Y. SEATON.